J. W. KENNEDY.

Derricks and Cranes.

No. 134,677. Patented Jan. 7, 1873.

Witnesses.

Inventor
J. W. Kennedy
by his Attys.
Hill & Ellsworth

UNITED STATES PATENT OFFICE.

JOSIAH W. KENNEDY, OF ST. LOUIS, MISSOURI.

IMPROVEMENT IN DERRICKS AND CRANES.

Specification forming part of Letters Patent No. 134,677, dated January 7, 1873.

*To all whom it may concern:*

Be it known that I, JOSIAH W. KENNEDY, of St. Louis, in the county of St. Louis and State of Missouri, have invented a new and Improved Portable Hoisting-Machine; and I do hereby declare the following to be a full and exact description of the same, reference being had to the accompanying drawing forming part of this specification, in which—

Figure 1:
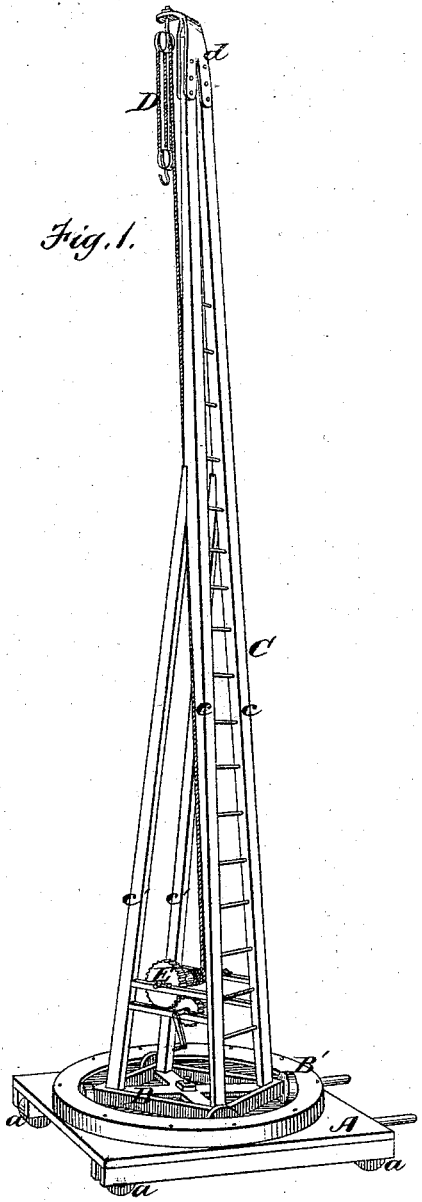
Figure 2:
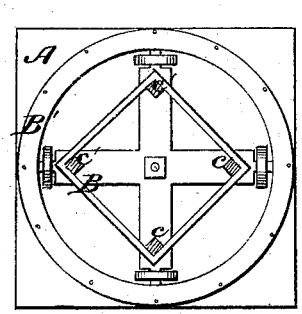
Figure 3:
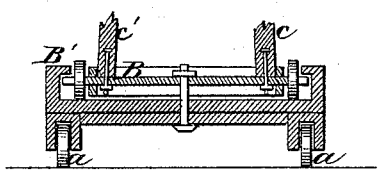

Figure 1 is a perspective view; Fig. 2, a horizontal section; and Fig. 3, a partial vertical section.

Similar letters of reference in the accompanying drawing denote the same parts.

The object of this invention is to provide, for merchants and others, a convenient and useful apparatus whereby boxes and bales of goods can be readily raised and lowered to and from the tiers in which they are piled in the warehouses; and to this end my invention consists in the improved combination of parts composing the machine and adapting it for its purpose, substantially as hereinafter set forth.

My improved machine consists of four parts, namely, a truck or carriage adapted to be moved back and forth between the tiers of boxes, &c.; a rotary horizontal frame supported on the truck; a vertical frame supported on the rotary horizontal frame; and a tackle and fall, and windlass for operating the same.

In the drawing, A represents the carriage, mounted on wheels *a a*, and, if necessary, provided with handles for convenience in moving it from place to place. B represents the horizontal frame, constructed preferably in the square form, with the diagonal cross-bars, the friction-rollers, the projecting trunnions, and the central pivot, shown in Figs. 1 2 3, and surrounded by a circular iron flange, B′, which extends over the trunnions and relieves the central pivot of any strain too great for its strength. C represents the vertical frame, constructed of two long inclined standards, *c c*, united by a clip, *d*, at their upper ends, and two short braces, *c′ c′*, fastened to the long standards near their middle, the whole being arranged and supported on the horizontal frame substantially as shown; and D represents the tackle and fall suspended from the clip *d* and connected to a common windlass, E, near the bottom of the vertical frame. The long standards may also be connected together by rounds, so as to serve the purposes of a ladder.

The operation of this machine is very simple and convenient. It can be run along in the warehouse to any spot where it may be needed, and the tackle brought directly over the bale without turning the truck. In lowering boxes and bales from the tier, the attendant ascends the ladder and adjusts the rope around the package, then descends, and, by a turn of the windlass, lifts the bale from the tier, when the machine with the bale thus suspended can be moved to any desired place and the bale readily lowered to its new position on the dray or elsewhere. The construction of the upright frame is such as to leave a recess near the top of the short braces *c′ c′*, to accommodate the suspended bale nearly in line with the center of the frame B; and when the bale is lowered the inclines *c′ c′* guide it outward again to the edge of the truck, where it dumps readily upon the dray, wagon, or tier of goods, where it is desired to place it.

Having thus described my invention, what I claim as new, is—

The improved portable hoisting-machine herein described, consisting of the movable carriage A, the rotary frame B working within the flange B′, the upright frame C, and the tackle, fall, and windlass, all combined substantially in the manner and for the purposes set forth.

JOSIAH W. KENNEDY.

Witnesses:
  N. K. ELLSWORTH,
  MELVILLE CHURCH.